US 6,524,058 B1

(12) United States Patent
Watters

(10) Patent No.: US 6,524,058 B1
(45) Date of Patent: Feb. 25, 2003

(54) ASSEMBLY AND METHOD FOR STACKING, CONVEYING AND LIFTING LIDS

(76) Inventor: Robert Watters, 12715 Kalamatn Ct., Westminster, CO (US) 80234

( * ) Notice: Subject to any disclaimer, the term of this patent is extended or adjusted under 35 U.S.C. 154(b) by 0 days.

(21) Appl. No.: 09/705,165

(22) Filed: Nov. 2, 2000

(51) Int. Cl.$^7$ .............................................. B65G 57/00
(52) U.S. Cl. ............................... 414/795.7; 414/795.8; 414/796.7; 414/796.9
(58) Field of Search ..................... 414/796.7, 796.9, 414/795.7, 795.8, 789, 797

(56) References Cited

U.S. PATENT DOCUMENTS

| | | | | |
|---|---|---|---|---|
| 3,027,021 A | * | 3/1962 | Kramer ..................... | 414/795.8 |
| 4,178,118 A | * | 12/1979 | Bailey ......................... | 414/788 |
| 4,350,330 A | * | 9/1982 | Brown ..................... | 414/795.8 |
| 4,451,191 A | * | 5/1984 | Torre ......................... | 414/796.9 |
| 4,478,327 A | * | 10/1984 | Siniscal et al. ........... | 414/795.8 |
| 4,509,891 A | * | 4/1985 | Lipscomb ................... | 414/797 |
| 5,011,126 A | * | 4/1991 | Suzuki et al. ............. | 414/795.7 |
| 5,070,990 A | * | 12/1991 | Heisler ..................... | 414/795.8 |
| 5,074,745 A | * | 12/1991 | Neri ......................... | 414/796.9 |
| 5,302,079 A | * | 4/1994 | Cestonaro et al. .......... | 414/788 |
| 5,569,016 A | * | 10/1996 | Mokler ..................... | 414/793.1 |
| 5,700,128 A | * | 12/1997 | Tonnigs et al. .......... | 414/796.7 |
| 5,807,065 A | * | 9/1998 | Kuhl ......................... | 414/796.7 |
| 5,944,477 A | * | 8/1999 | Shill .......................... | 414/788 |
| 6,065,925 A | * | 5/2000 | Carson et al. .............. | 414/627 |
| 6,106,219 A | * | 8/2000 | Newsome et al. ........ | 414/790.6 |

* cited by examiner

*Primary Examiner*—Kathy Matecki
*Assistant Examiner*—Sang Kim
(74) *Attorney, Agent, or Firm*—Jennifer S. Stachniak

(57) ABSTRACT

An assembly for conveying and stacking lids for containers includes a doubled-strand conveyor, a stacking and alignment column at an input end of the conveyor for aligning a stack of lids, and a vertical feed column at an output end of the conveyor for incrementally lifting the stack of lids for removal and placement onto a container. Both the stacking and alignment column and the vertical feed column are each defined by a set of four guide rods for alignment of the lid stack. Each set of guide rods includes a pair of inboard, pivotable guide rods which pivot out of the path of the conveyed lid stack to allow the stack to move out of the stacking and alignment column or into the vertical feed column, respectively. A vertical feeder disposed under the vertical feed column comprises a vertical feed plate and a linear actuator regulated by a sensor device that controls the raising and lowering of the plate and senses when the feeder plate has been depleted of lids.

22 Claims, 5 Drawing Sheets

ASSEMBLY AND METHOD FOR STACKING, CONVEYING AND LIFTING LIDS

BACKGROUND OF THE INVENTION

The present invention relates generally to conveyor and stacking systems for a magazine of articles. More specifically, this invention relates to a continuous conveyor having a plurality of pivotable guide bars, a stacking and alignment area at its input end, and at a vertical lid feeder at its output end from which the lids are transported for application onto containers. The present invention also concerns a method for stacking, conveying and lifting a plurality of lid stacks for application onto containers.

Devices for both stacking, unstacking, and conveying stacks of articles, such as flat or sheet-like products, have been developed for the quick and easy processing or packaging of these articles for various purposes. See for example, U.S. Pat. No. 5,569,016 to Mokler; U.S. Pat. No. 6,065,925 to Carson, et al; U.S. Pat. No. 5,807,065 to Kuhl; and U.S. Pat. No. 6,106,219 to Newsome et al. These patents represent attempts to provide automated systems for efficiently moving stacks of articles from one location to another or removing the articles form the stacks one piece at a time.

However, a specialized need exists for a stacking and conveying device for use in the postal system, which the devices described in the above-referenced patents do not address. In the postal system, an extraordinarily large amount of mail passes through centralized postal centers, which must be sorted and then transported on to local post offices for distribution. In these postal centers, specially sized cartons or containers with lids are used to place pieces of mail destined for the same postal areas together or to otherwise contain numerous and various articles for transport without loss or misplacement of any articles. Generally, large, box-shaped plastic or cardboard containers or trays are used with specially formed lids which are cut and sized to fit into the tops of the containers. The lids typically have notched corners and creases at their edges to facilitate folding of the notched portions and edges upon application of the lids into the open tops of the containers.

Conveyor systems are typically employed to move the cartons or containers along for manual or automatic filling with articles of mail. However, the specially formed lids must be manually folded and applied to the containers, specifically, inserted to fit tightly into the tops of the containers. This is obviously a time consuming process and often requires pausing the conveyor system which handles the postal trays or cartons full of mail so that the individual applying the lids to the tray can keep up, or catch up, with the automatic conveyor system. The person applying the lids must also retrieve and stack enough lids to apply to the stream of cartons, and periodically stop the conveyor system to resupply the stack of lids once it has been depleted.

Thus, a need exists for an automatic assembly for stacking, aligning, conveying and applying lids onto containers so that the containers can more quickly and efficiently be covered and transported off to their respective destinations, without the need to periodically pause the conveyor as it conveys the lids.

SUMMARY OF THE INVENTION

Therefore, a general object of the present invention is to provide an assembly for stacking, aligning, conveying and lifting numerous lids for containers to allow automatic application of the lids onto containers.

It is a further object of the present invention to provide a conveyor system which can move a plurality of stacks of the lids from an input end to an output end.

It is another object of the present invention to provide a stacking and feeding area or column at the input end of the conveyor which is manually loaded and which aligns a stack of lids before transporting the stack on the conveyor.

It is yet another object of the present invention to provide a plurality of vertical guide rods at the stacking and feeding area of the conveyor for proper alignment of the lids.

A still further object of the present invention is to provide a first pair of is pivotable guide rods at the stacking and feeding area of the conveyor which move out of the path of the lid stack when the stack is full and moved from the stacking and alignment column.

Another object of the present invention is to provide a two-strand conveyor belt which allows the conveyor system to be accessed from below to allow the vertical feed assembly to advance between the belts, and which has a length that will allow numerous stacks of aligned lids to be conveyed thereon.

Yet another object of the present invention is to provide a second set of pivotable guide rods at an output end of the conveyor which pivot out of the path of the conveyed stacks to allow the stack to enter into a vertical feed area.

Still another object of the present invention is to provide a vertical feed area at the output end of the conveyor which lifts a stack of lids vertically from the conveyor surface to allow the topmost lid on the stack to be removed and transported for application onto a container.

A further object of the present invention is to allow the conveyor to continue indexing stacks forward from the input end to the output end while the vertical feed assembly is engaged.

Another object of the present invention is to allow the assembly to be used in combination with means for lifting the topmost lid on a stack and transferring it to a second conveying area and means for automatically applying the lid to the top of a container.

In order to meet these and other objects, the present invention generally comprises a preferably double-belt conveyor, a stacking and alignment region for a magazine of generally flat articles at one end of the conveyor defined by a first set of guide rods, and a vertical feeding region at an opposite end of the conveyor defined by a second set of guide rods, each of the first and second set of guide rods including a pair of pivotable rods. The assembly preferably includes means for lifting and transporting the topmost lid from a stack of lids in the vertical feeding region to a second conveyor area and means for applying the lid to a container.

The conveyor has oppositely disposed input and output ends. At the input end of the conveyor, four inboard guide rods are positioned to define a stacking and alignment region or column for a vertical stack of articles, in this case, container lids. Two of the four guide rods are fixed, or unmoveable, while the other two guide rods are pivotable, such that after a stack of lids is lowered into the stacking and alignment region, the two pivotable guide rods are pivotable out of the path of the stack of lids as it moves from the stacking and alignment column 14 for transport to the output end. The four guide rods are spaced to fit into respective notched corners of the container lids and served to align the stack of lids as they are manually loaded into the stacking region or column.

After the stack of lids is full, the pair of pivotable inboard rods on the conveyor pivot out of the path of the stack as it is conveyed out of the stacking and alignment column 14. The conveyor indexes forward to allow another stack to be loaded into the stacking and alignment column. A series of stacks are thus loaded, aligned, and moved out of the stacking and alignment column 14 in the same manner, until the conveyor surface is full of adjacently arranged stacks of lids.

The stacks of lids are conveyed toward the out put end of the conveyor, where the vertical feed column, defined by four guide rods, including a pair fixed guide rods and a pair of pivoting guide rods, is located. As the foremost or lead stack on the conveyor surface approaches the vertical feed region, a second pair of pivoting guide rods swings open out of the path of the lead stack to allow the stack to enter the vertical feed region. The lids are conveyed up against the fixed rods at the far-most end of the conveyor to square the stack. The feed conveyor stops, and the second pair of pivoting guide rods swing close to assist in squaring and guiding the stack.

After the stack is squared and aligned properly in the vertical feed region, a vertical lid feeder, which preferably comprises a plate mounted or attached to a linear actuator, is advanced until an upper limit is reached. After each subsequent upward advancement of the vertical feeder, the uppermost lid in the stack is removed, such as by a vacuum or suction device, and transported to a second, container conveying area where it is applied onto the top of a container. This upper limit is preferably determined by a sensor. Once the upper limit is reached, the feeder stops and remains at rest until a number of lids have been removed. The sensor also works to detect a lower limit of the vertical feeder, such that when this lower limit is sensed, the vertical lid feeder advances until the upper limit is sensed, and the above-described process is repeated.

When a complete stack of lids has been removed from the vertical feed region, a vertically mounted sensor detects that the stack is empty. The lid feeder then fully retracts, the inboard rods pivot open, and the next stack moves into the vertical feed region.

An important feature of the present invention is the ability of the conveyor to continue to index the stacks of lids along the conveyor surface while the vertical feed assembly is engaged. That is, each stack of lids continues to be moved forward from station to station as it is conveyed from the input end to the output end until the stack reaches the second set of pivotable guide. This allows the operator of the assembly to continue to load the stacking and alignment column and index several stacks forward while the vertical feed assembly continues to operate, without having to pause the conveyor and have unwanted "downtime".

The above-described conveyor system is especially contemplated for use with a lid transport and application apparatus and a second, container conveyor system. In this application, the lid transport and application apparatus picks up the topmost lid in the stack contained in the vertical feed region, preferably by vacuum or suction means, and transport the lid horizontally from the lid conveyor assembly to a second conveyor assembly, upon which a series of tubs or containers are moved. The lid transport and application apparatus moves the lid to a location above a container to be covered, then lowers the lid onto the top of the container while simultaneously folding the edge flaps of the lid downward for insertion into the container. The second conveyor then indexes the covered container forward and moves the next container to be covered into position.

The present invention also contemplates a method for stacking, aligning, conveying, and vertically feeding a plurality of stacks using the above-described apparatus.

DETAILED DESCRIPTION OF THE PREFERRED EMBODIMENTS

Figure 1:
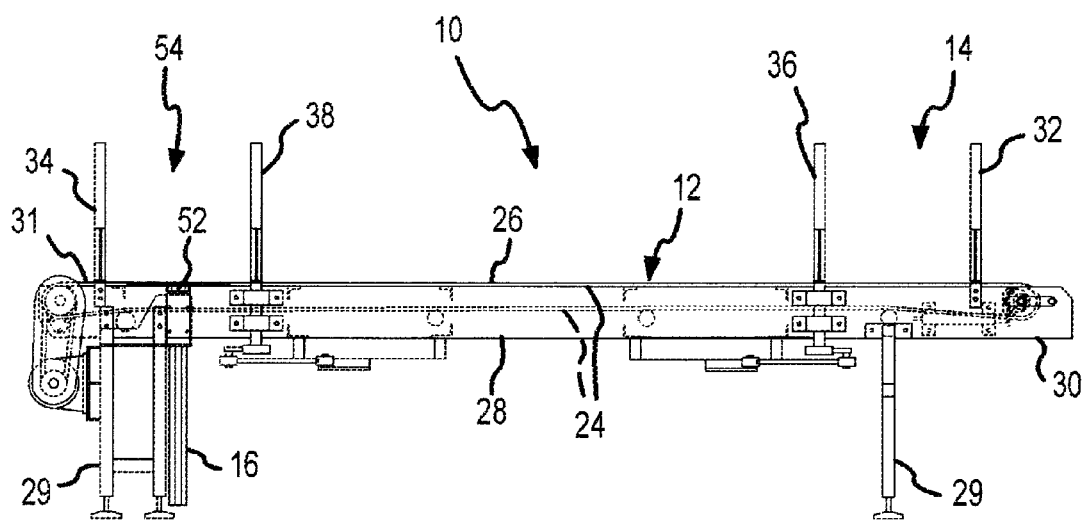
FIG. 1 is a side view of the lid conveyor assembly of the present invention.

The present invention, which comprises a stacking, alignment, conveyor, and feeder assembly, will now be described with reference to FIGS. 1–8. The assembly 10 generally comprises a conveyor 12, a first, lid stacking and alignment column 14 positioned at one end of the conveyor, a second, vertical lid feed column 54 positioned at an opposite end of the conveyor, and a vertical feed assembly 16 positioned below the vertical feed column 54 for vertically moving a stack of articles within the vertical feed column 54.

In a preferred form of the present invention, the conveyor 12 includes a plurality of guide rods, some of which are fixed rods 32, 34 and some of which are pivotable rods 36, 38 for alignment and squaring of the lid stacks in the lid alignment column 14 and vertical feed column 16.

As FIGS. 9–12 illustrate, the lid conveyor assembly 10 is contemplated for use with a lid transport and application assembly 100 and a second conveying system 200, which holds and transports containers or tubs 202 to be covered by the lids 18 after the lids 18 are transported from the vertical lid feeder 16 with the transport and application assembly 100. The lid conveyor assembly 10 is shown used in conjunction with the transport and application assembly 100 and the second conveying system 200 in FIGS. 9–12 and will be described in greater detail below.

Figure 2:
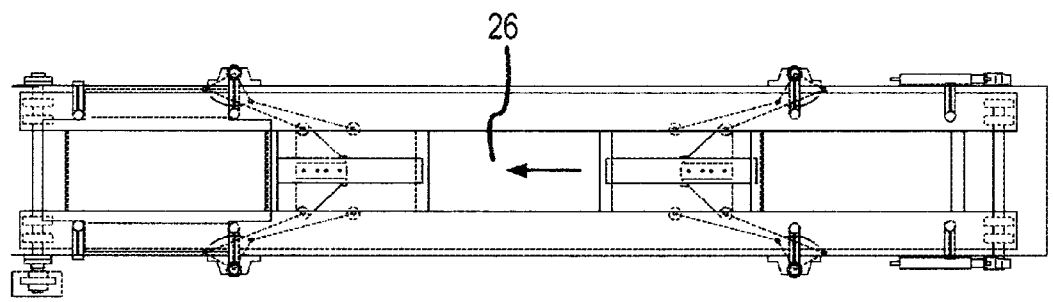
FIG. 2 is a top view of the conveyor surface of FIG. 1, showing the pivoting guide bars.
Figure 3:
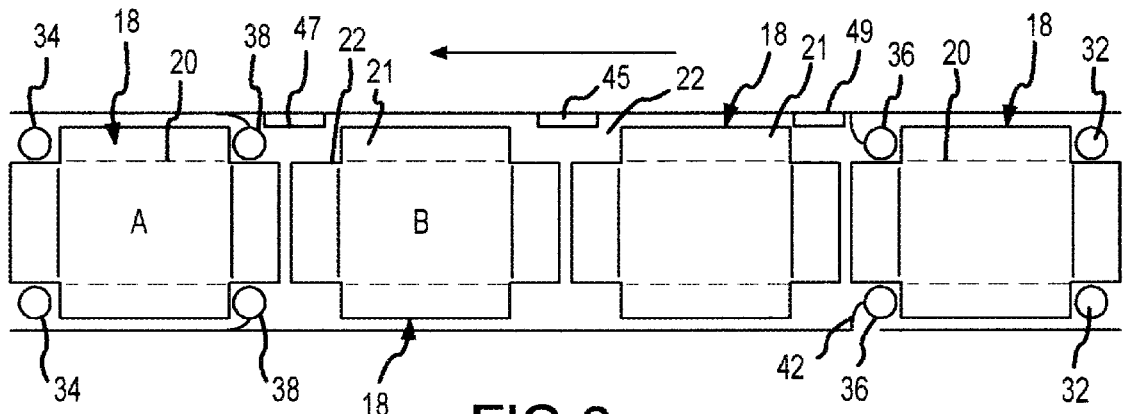
FIG. 3 is a top view of the several stacks of lids as arranged on the conveyor surface of FIG. 2.

Returning to the lid conveyor assembly 10 of FIGS. 1–8, the assembly 10 is contemplated for use with specially designed lids, or covers, 18, sized and formed to fit over the tops of large tubs or containers 202 generally utilized by the U.S. Postal Service for holding and transporting articles of mail. As shown in FIG. 3, the lids have notched corners 22 and are precreased at the edges 20 to form tabs 21 and to facilitate folding of the tabs 21 when the lids 18 are placed into the containers 202.

While the standard size of the lids 18 typically used in this application are 19 1/4"×26 7/8", it is also possible that the inventive assembly described herein can be employed to stack, align, convey and feed various other sizes of lids or other flat articles capable of being stacked into magazines and aligned, such as envelopes, flattened cartons or boxes, and the like.

As FIGS. 1 and 2 illustrate, the conveyor portion 12 of the assembly comprises a frame member 28 with support members 29, an input end 30 and an oppositely disposed output end 31, and a two-strand conveyor belt 24 for conveying a plurality of stacks of lids 18 upon its upper conveying surface 26. The two-strand conveyor belt 24 accommodates the vertical movement of the vertical feed assembly between the belts. Positioned along an inside panel of the frame 28, proximate the upper conveying surface 26, are plurality of conveyor sensors 45, 47, 49, which may comprise a limit switch, a photoelectric eye, a proximity sensor, or any device capable of detecting the presence of a stack of lids as it is moved upon the upper conveying surface 26. The conveyor sensors 45, 47 serve to detect a stack of lids 18 and stop further movement of the conveying surface 26, and thus, the lids 18 thereupon, to allow a new stack of lids to be loaded into the stacking and alignment column 14, in the manner to be described below. The conveyor 12 preferably utilizes a one-half horse power motor for driving the conveyor belt 24 and includes a clutch-brake assembly for stopping conveyor movement.

As shown in FIG. 3, a number of stacks of lids A–D can be horizontally conveyed on the conveyor surface 26 from the input end 30 to the output end 31 (i.e., from the stacking and alignment column 14 to the vertical feeder 16). FIG. 3 shows a series of lid stacks A–D in their respective positions during progression through the assembly 10, that is, stack A has been conveyed within and aligned by vertical guide rods 34, 38 which define the vertical feed column 54 for lifting by the vertical feeder 16, while stack D is shown loaded into and aligned by the vertical guide rods 32, 36 which define the stacking and alignment column 14 and awaiting indexing out of the stacking and alignment column 14. While FIG. 3 shows four stacks arranged on the conveyor 12, obviously the conveyor 12 could be sized to accommodate more or fewer stacks.

In one embodiment of the invention, the assembly 10 has a length to accommodate up to four stacks of lids A–D, as shown in the top view of the assembly 10 in FIG. 3. Stack D is shown loaded and stacked within the first set of guide rods 32, 36 in the stacking and alignment column 14; stacks B and C are shown on the conveyor surface 26 between the stacking and alignment column 14 and the vertical feed column 54; and stack A is shown within the second set of guide rods 34, 38 in the vertical feed vertical feed column 54. Preferably, proximity sensors 45, 47 are disposed in the conveyor frame 28 to stop the forward indexing of a stack upon the conveyor surface 26 at selected locations, i.e., the positions of stacks B and C. That is, a stack will be indexed forward from the stacking and alignment column 14 until its presence is detected by a first sensor 45, at which point the stack will stop at the location of stack C. When a new stack is ready to be indexed forward from the stacking and alignment column 14, stack C is then indexed forward until its presence is detected by the second sensor 47, at which point the stack will stop at the location of stack B, that is, in front of the pivotable guide rods 38 which define the vertical feed column 54. Once the vertical feed column 54 is empty, that is, all of the lids in a stack have been removed, the pivotable guide rods 38 then open to allow the stack in position B to move forward into the vertical feed column 54.

The stacks of lids are conveyed from the lid stacking and alignment column 14, located at the lid input end 30 of the conveyor 12 (stack D in FIG. 3). The stacking and alignment column 14 is defined by a first set of four vertical guide rods 32, 36 arranged perpendicular to the horizontal conveying surface 26. The guide rods 32, 36 are arranged to fit within the four notched corners 22 of the lids 18 as a stack of lids is manually lowered into the stacking and alignment column 14.

Figure 4:
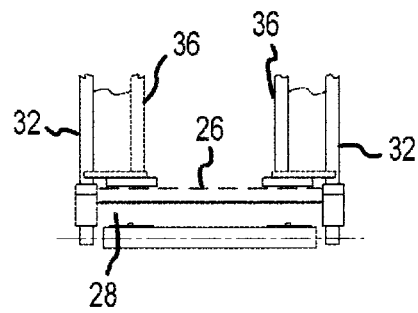
FIG. 4 is an end view in detail of the lid conveyor system at the lid input end showing the arrangement of the pivoting guide rods.
Figure 5:
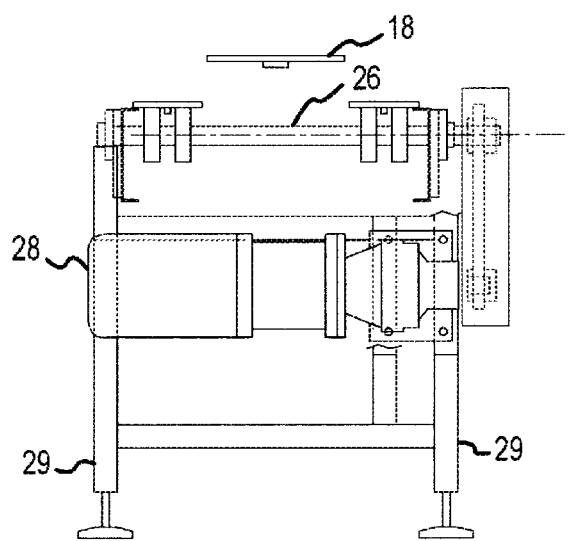
FIG. 5 is a view of the opposite end of the conveyor system from the end shown in FIG. 4.

As shown in FIG. 4, two of the vertical guide rods 32 comprising the stacking and alignment column 14 are fixed rods, secured to an outside panel of the conveyor frame 28 at a first longitudinal end of the conveyor, or the input end 30. These fixed rods 32 serve to square and align the stack of lids 18 placed within the lid stacking and alignment column 14.

The remaining two vertical guide rods defining the lid stacking and alignment column 14 are pivotable guide rods 36 disposed in an inboard location on the conveyor 12. The inboard, pivotable guide rods 36 are mounted in bearings or bushings 40, which, in turn, are mounted in the conveyor frame 28 in pivot brackets 42. Each of the pivotable guide rods 36 is activated, in the manner to be described below, by a respective lever arm 44 connected to a linear actuating device 46, such as a pneumatic cylinder or hydraulic cylinder, retained in the frame by a cylinder bracket 48. Activation of the respective linear actuating devices 46 causes the pivotable guide rods 36 to pivot open, or swing out of the path of the lid stack as it is indexed forward. Once a stack has been moved from the stacking and alignment column 14, it is moved forward sufficiently to allow the pivotable guide rods 36 to pivot closed for loading and alignment of a new stack of lids into the stacking and alignment column 14 without having to stop the conveyor 12.

Figure 6:
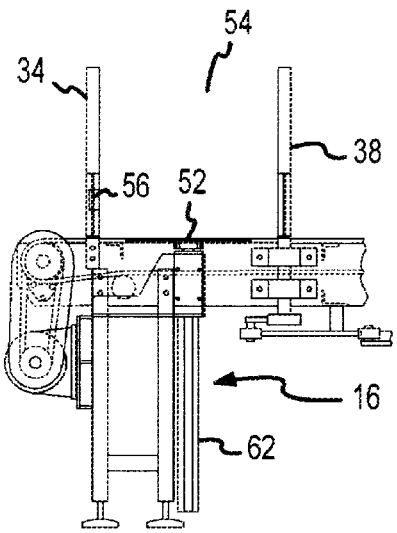
FIG. 6 is a side view of the lid conveyor system showing the vertical feed area, or lid lifting table.
Figure 7:
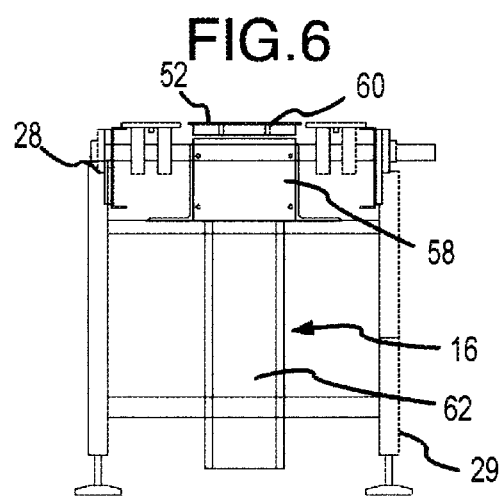
FIG. 7 is an end view of the lid conveyor system showing the vertical feed area, or lid lifting-table.
Figure 8:
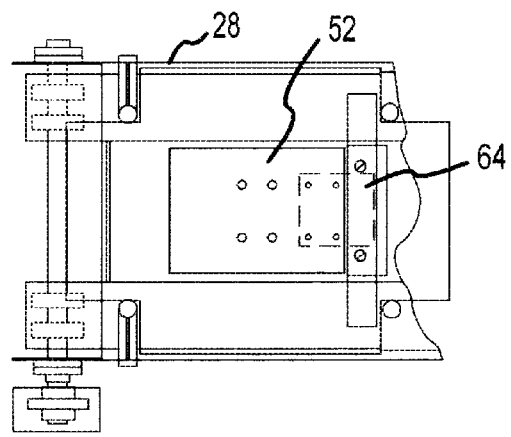
FIG. 8 is a top view of the vertical feed area, or lid lifting table.
Figure 9:
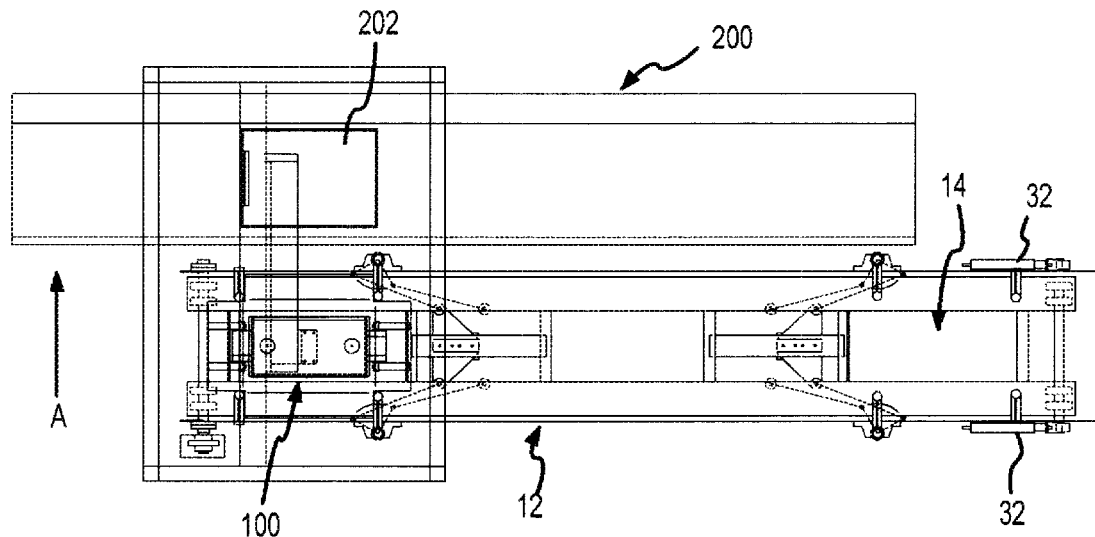
FIG. 9 is a top view of the lid conveying system in relation to the container conveying assembly, also showing the lid transport and application apparatus joining the conveying systems.

As shown in FIG. 6, at the output end 31 of the conveyor 12, a vertical feed assembly 16 is positioned, comprising a lifting plate or table 52 and a linear actuator 62, onto which the lifting plate 52 is mounted and connected. A second set of four vertical guide rods 34, 38 define a vertical feed column 54, where the stacked lids 18 are held for sequential removal, as will be described below. The linear actuator 62 which lifts and lowers the lifting plate or table 52 is preferably an externally guided pneumatic cylinder mounted below the stack to be lifted and between the two conveyor belts 24, or, in the alternative, a ball screw, jack or hydraulic cylinder can be employed for lifting the lid stack. The vertical feeder assembly 16 includes a brake bar 64 for limiting lateral movement of the assembly 16 during operation.

As with the lid stacking and alignment column 14, two of the four vertical guide rods are fixed rods 34 secured to an outside panel of the conveyor frame 28, perpendicular to the conveying surface 26, which serve to square and align the vertical stacks of lids 18 as they are moved onto the vertical feeder 16, in the manner to be described below. The other two vertical guide rods defining the vertical feed column 54 are pivotable guide rods 38 disposed in an inboard location on the conveyor 12. As with the above-described pivotable guide rods 36, the inboard, pivotable guide rods 38 are mounted in bearings or bushings 40, which, in turn, are mounted in the conveyor frame 28 in pivot brackets 42. Each of the pivotable guide rods 38 is activated by a respective lever arm 44 connected to a linear actuating device 46, such as a pneumatic cylinder or hydraulic cylinder, retained on the frame by a cylinder bracket 48.

Upon activation by the cylinder or other actuating device 46, the guide rods 38 pivot open to allow a stack of lids 18 on the conveyor surface 26 to be indexed into the vertical feed area 16, and onto the lifting plate 52 (such as stack A, shown in FIG. 3). The stack of lids 18 is conveyed against the fixed guide rods 34 on the second longitudinal end of the conveyor frame 28 (i.e., at the output end 31 of the conveyor) in order to square and align the stack again. The forward conveyor movement is then stopped (i.e., by activation of the sensor 45), and the inboard pivot rods 38 pivot into the closed position to assist in squaring and aligning the stack of lids within the vertical feed area 16.

Once a stack of lids is aligned and squared within the four guide rods 34,38, the vertical feeder plate 52 can begin to move the stack upwardly to allow removal of the topmost lid 18 in the stack by the lid transport and application assembly 100, which will be described in more detail below with reference to FIGS. 9–12.

The upward movement of the vertical lid feeder plate 52 by operation of the linear actuating device 62 is monitored and controlled by a first vertical sensor 56, preferably comprising a limit switch with an adjustable roller arm, which is fixed to one of the fixed guide rods 34 of the vertical feed column 54, as shown in FIG. 6. As with the sensor 45 on the conveyor 12, the vertical lift sensor 56 could also comprise other types of detection devices, including, by way of example, a photoelectric eye, a proximity sensor, or any similar device. The vertical lid feeder plate 52 is advanced until an upper limit, determined by the sensor 56, is reached. When the stack reaches this elevation, the vertical feeder 16 pauses and remains inactive until a number of lids 18 have been removed from the top of the stack (i.e., by the lid transport and application assembly 100 to be described below). Likewise, the sensor 56 can detect a lower limit of the vertical feeder 16, that is, when the plate 52 is in the same plane, or is even with, the conveyor surface 26. When this lower limit is sensed, the vertical lid feeder 16 advances until the upper limit is sensed, and the process is repeated for sequential stacks of lids.

After a complete stack of lids 18 has been removed from the vertical lid feeder 16 (i.e., from the vertical feeder plate 52) a second vertical sensor 60, mounted on the conveyor frame 28 below the conveying surface 26 next to the feeder plate 52 with a mounting bracket 58, detects that the stack has been depleted and that the vertical feed lifting plate 52 is empty. The lid feeder 17 then fully retracts, or lowers vertically, the inboard pivotable rods 38 pivot open, and the next stack (stack B in FIG. 3) moves onto the vertical feeder 16. The notched comers 22 of the lids in the next stack B are then conveyed up against the fixed guide rods 34 to be squared and aligned, while the pivotable guide rods 38 pivot close to further square and align this next stack B.

In the preferred form of the invention, the conveyor proximity sensors 45, 47, 49 and the vertical proximity sensors 56, 60 are in communication with a PCL control assembly (not shown), which controls the conveyor's forward indexing and the vertical feed assembly operation. The PLC control assembly preferably includes a visual display, such as a flashing signal (not shown) mounted to the conveyor frame 28, which indicates to the operator of the assembly that the last stack (i.e., stack D in FIG. 3) has been conveyed from the stacking and alignment column 14 and is now in the vertical feed column 54. This signal thus allows the operator to reload the stacking and, alignment column 14 while the vertical feed column 54 is still engaged and to index several more stacks forward to avoid any "downtime" between depletion of the stack in the vertical feed column 54 and the reloading of the conveyor surface 26.

An important feature of the present invention is the ability of the conveyor to continue to index the stacks of lids along the conveyor surface while the vertical feed assembly 16 is engaged. That is, each stack of lids continues to be moved forward from station to station as it is conveyed from the input end to the output end until the stack reaches the second set of pivotable guide rods 38 (i.e., the position of stack B in FIG. 3). This allows the operator of the assembly to continue to load the stacking and alignment column 14 and index several stacks forward while the vertical feed assembly 16 continues to operate, without having to pause the conveyor.

In order to clarify and summarize the above-described features relative to one another, the operation of the assembly 10 will now be described with reference to a single stack of lids as it progresses through the various stations of the assembly 10. The lids 18 are manually loaded into the stacking and alignment column 14 located at first end, or input end, of the assembly. Loading of the column 14 is most easily accomplished by lowering a stack of lids 18 into the column so that the rods 32, 36 are received into the notched comers 22 of the lids 18 and abutted against them. The height of the loaded stack preferably should extend no higher than several inches below the open ends of the guide rods 32, 36.

Once the stack has been loaded into the column 14, the inboard rods 36 on the conveyor 12 pivot outwardly out of the path of the oncoming stack and the conveyor indexed forward a sufficient distance to allow another stack to be loaded into the column 14 in the manner described above. The stack is conveyed upon the conveyor surface 26 until the conveyor 12 is stopped upon detection of the stack by a first sensor 45 disposed in the conveyor frame 28 proximate the conveyor surface 26. When a second stack is moved forward behind the first stack, the first stack is indexed forward until stopped by proximity sensor 47.

Once the vertical proximity sensor 60 determines that the vertical feed column 54 has bee depleted of lids, the second set of pivotable guide rods 38 are pivoted outwardly into the open position to allow the first stack to continue to move forward into the vertical feed column 54 and onto the vertical feed plate 52. Two notched comers 22 of the lids in the stack are conveyed firmly against the fixed rods 34 for alignment of the stack; the pivotable guide rods 38 then swing into the closed position and press against the opposite two notched comers 22 of the lids to further align the stack within the vertical feed column 54.

Once the stack has been properly aligned in onto the vertical feeder 16, the linear actuator 62 indexes the stack upward to allow removal of the topmost lid in the stack for placement onto the top of a container. After the stack has been emptied, the pivotable guide rods 38 are actuated and opened in the above-described manner to allow a new stack to enter the vertical feed column 54.

As noted above, the lid conveyor assembly 10 is contemplated for use with a lid transport and application assembly 100 for removing the topmost lid from the stack in the vertical feeder 16, transporting it to a container or tub 202, and applying the lid onto the container 202. Such an assembly is shown in FIGS. 9–12. Preferably, the containers 202 are likewise moved into position for lid application by a second conveyor system 200, also illustrated in FIGS. 9–12.

Figure 10:
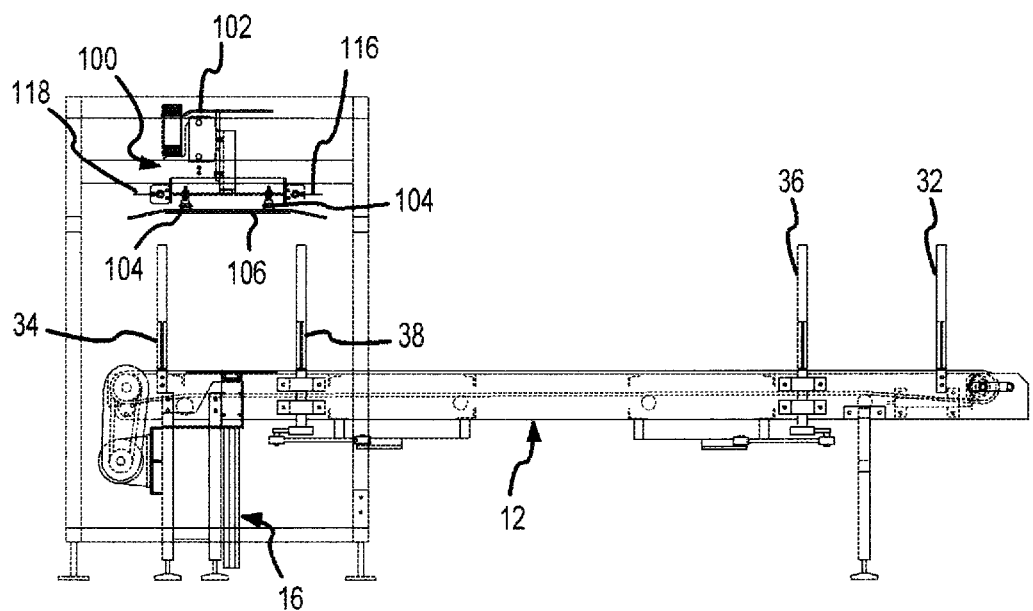
FIG. 10 is a side view of the lid conveying assembly showing the lid transport and application apparatus.

As shown in FIG. 10, the transport and application assembly 100 may comprise a moveable carriage 102 having a track 108 with a first end 110 disposed approximately above the vertical feed column 54 and a second end 112 disposed approximately above a portion of the second conveyor 200. The carriage 102 includes lifting means 104 for removing the topmost lid 106 from the stack in the vertical feed column 54 and a pair of rotary actuators 116, 118 for folding the lid tabs 21 formed by the precreased edges 20. The carriage 102 further comprises a lid pushing member 120 for applying the lid 106 onto the container 202.

Lifting means 104 preferably comprise suction or vacuum members having a force sufficient to draw the topmost lid 106 upwardly against the lifting means 104. Once the topmost lid 106 is retained against the lifting means 104, the carriage 102 is automatically deployed along the track 108, carrying the lid 106 with the tabs 21 unfolded, toward the second end 112 in the direction indicated by the arrow A in FIG. 9 to stop approximately above a container 202 on the conveyor 200.

The rotary actuators 116, 118 comprise rotatable bars disposed approximately above the tabs 21 when the lid 106 is retained on the carriage by the lifting means 104. Upon actuation, the bars are rotated downward and inward, thereby pressing the lid tabs 21 downward and inward to allow the lid 106 to be inserted into the top of the waiting container 202.

Figure 11:
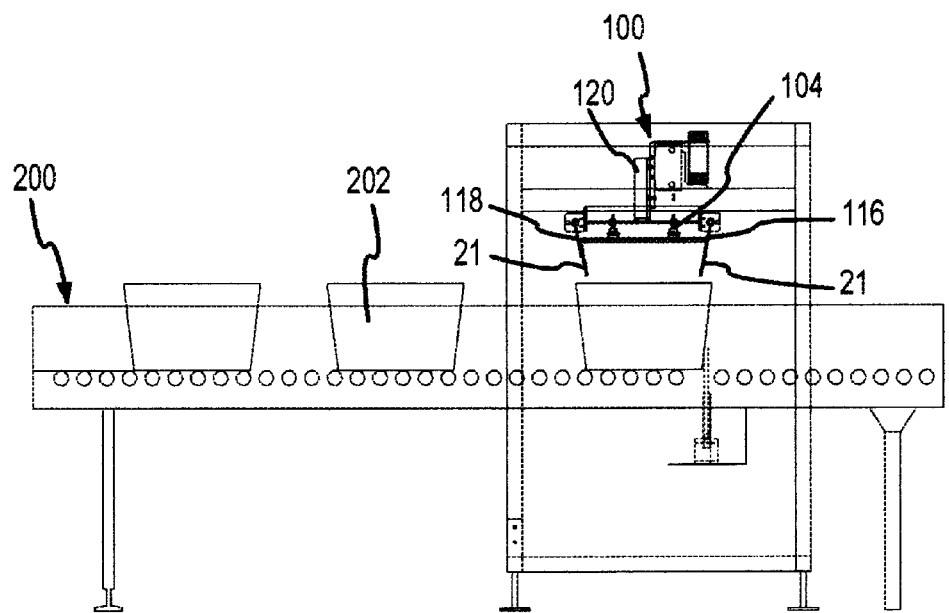
FIG. 11 is a side view of the container conveying system and the lid transport and application apparatus.
Figure 12:
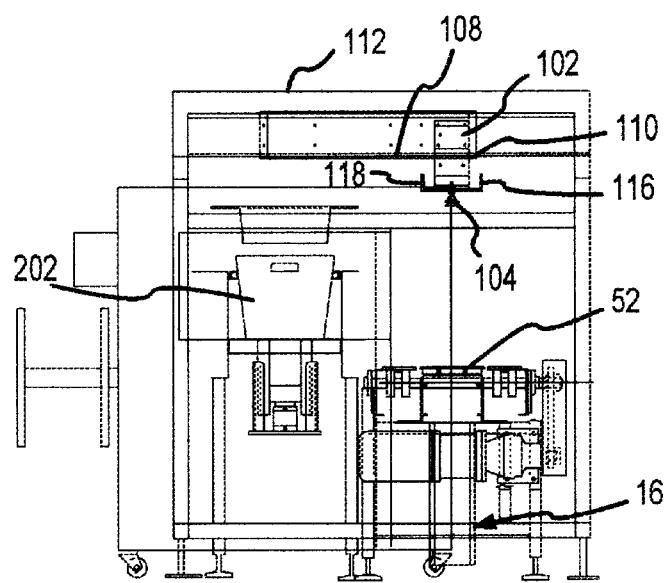
FIG. 12 is an end view of the lid conveying assembly, container conveyor, and lid transport and application apparatus.

The lid pushing member 120 is disposed approximately at the middle of the carriage 102 and is moveable by actuation of a linear actuator 124 such as a pneumatic cylinder, between a retracted position shown in FIGS. 10–12 and an extended position (not shown). The pushing member 120 must be in the retracted position during movement of the carriage. Once the tabs 21 have been folded inwardly by the rotary actuators 116, 118, the lid pushing member 120 is actuated. Upon actuation of the linear actuator 124, the lid pushing member 120 is extended to a selected length, thereby pushing the lid 106, with tabs 21 folded, into the top of the container 202. The container 202, with the lid in place, is then indexed along the conveyor 200 and the next container on the conveyor is indexed into position between the second end 112 of the carriage track 108.

Although the lid conveyor assembly 10 has been described for use with the lid transport and application assembly 100 and container conveyor 200 above, it is also within the scope of the present invention to utilize various other assemblies and systems for removal of the topmost lid from the lid stack in the vertical feeder 16 and apply the lid to the top of an appropriately sized container.

The present invention is, of course, in no way restricted to the specific disclosure of the specification and drawings, but also encompasses any modification within the scope of the appended claims.

What is claimed is:

1. An assembly for stacking, aligning, conveying and feeding stacks of articles, comprising:
   a single conveyor having an input end and an oppositely disposed output end, said conveyor comprising a frame and an upper conveyor surface for conveying a plurality of said stacks of articles from said input end to said output end, each of said stacks comprising a plurality of articles;
   a first column positioned at the input end of said conveyor, said first column defined by a first set of guide rods for alignment of one of said stacks contained within said first column;
   a second column positioned at the output end of said conveyor, said second column defined by a second set of guide rods for alignment of one of said stacks contained within said second column;
   a vertical feed assembly disposed, below said second column for vertically advancing said stack of articles contained in said second column for removal of a topmost article in said stack, said upper conveyor of surface indexing said plurality of stacks from said input end to said output end upon connection of article removed;
   wherein each said first and second set of guide rods includes at least two pivotable guide rods disposed on said conveyor and adapted to pivotably move out of a conveyance path of said stacks upon said upper conveyor surface as said stacks are conveyed from said input end to said output end, wherein said at least two guide rods are positioned to fit within notched corners of said articles.

2. The assembly according to claim 1, wherein said vertical feed assembly comprises a feeder plate and a linear actuator connected to one side of said feeder plate.

3. The assembly according to claim 1, wherein each said first and second set of guide rods includes a pair of fixed guide rods, each said pair fixedly secured to said conveyor frame.

4. The assembly according to claim 1, wherein each said pivotable guide rod comprises a lever arm and a linear actuator connected to said lever arm.

5. The assembly according to claim 4, wherein said linear actuator is a pneumatic cylinder or a hydraulic cylinder.

6. The assembly according to claim 1, further comprising at least one sensor positioned in said conveyor frame proximate to the upper conveyor surface for detecting movement of said stacks upon said conveyor surface.

7. The assembly according to claim 1, further comprising at least one sensor vertically mounted in said vertical feed column for regulation of upward and downward movement of said vertical feed assembly.

8. The assembly according to claim 1, wherein said conveyor is a double-belt conveyor.

9. The assembly according to claim 1, wherein said vertical feed assembly includes a brake assembly for limiting movement of said vertical feed assembly.

10. A method for stacking, conveying, and feeding a plurality of stacks of articles, said method comprising the steps of:
    providing a conveyor having an input end and an oppositely disposed output end, said conveying having a frame member and an upper conveying surface;
    providing a stacking and feeding column at the input end of said conveyor, said stacking and feeding column defined by a first set of guide rods for alignment of said stack within said stacking and feeding column, wherein two guide rods in said first set of guide rods are pivotable guide rods mounted on said frame member proximate said conveyor surface and two of said guide rods in said first set of guide rods are fixed guide rods fixedly secured to said conveyor frame;
    providing a vertical feed column at the output end of said conveyor, said vertical feed column defined by a second set of guide rods for alignment of said stack within said vertical feed column, wherein two guide rods of said second set of guide rods are pivotable guide-rods mounted on said frame member proximate said conveyor surface and two of said guide rods in said second set of guide rods are fixed guide rods fixedly secured to said conveyor frame;

providing a vertical feeder assembly below said vertical feed column for incrementally vertically advancing said stack of articles contained within said vertical feed column;

loading one said stack of articles into said stacking and alignment column by lowering said stack of articles into said column so that said first set of guide rods fit into and abut notched corners of said articles;

aligning said stack of articles in said stacking and aligning column against set first set of guide rods;

actuating said pivotable guide rods in said first set of guide rods, whereby said pivotable guide rods are pivoted outward relative to a conveying path of said stack;

conveying said stack of articles from said stacking and conveying column;

conveying said stack of articles upon said conveying surface toward said vertical feed column;

actuating said pivotable guide rods in said second set of guide rods, whereby said pivotable guide rods are pivoted outward relative to a conveying path of said stack;

conveying said stack of articles into said vertical feed column such that a first pair of said notched corners of said articles are pressed against said fixed guide rods in said second set of guide rods;

actuating said pivotable guide rods in said second set of guide rods, whereby said pivotable guide rods are pivoted inward relative to the conveying path and pressed against a second pair of said notched corners;

aligning said stack of articles in said vertical feed column with said second set of guide rods;

vertically advancing said aligned stack of articles in said vertical feed column for removal of a topmost article in said stack.

11. The method of claim 10, further comprising the step of providing at least one sensor on said conveyor frame proximate to said conveyor surface for detecting movement of said article stacks and controlling advancement of said article stacks on said conveyor surface.

12. The method of claim 10, further comprising the step of providing at least one vertically mounted sensor in said vertical feed column for controlling upward and downward movement of said vertical feeder assembly.

13. An assembly for stacking, aligning, conveying and feeding stacks of articles, comprising:

a single conveyor having an input end and an oppositely disposed output end, said conveyor comprising a frame and an upper conveyor surface for conveying a plurality of said stacks of articles, wherein each of said stacks comprises a plurality of articles;

a first column positioned at the input end of said conveyor for stacking and aligning one of said stacks, wherein said at lest two guide rods are positioned to fit within notched corners of said articles;

a second column positioned at the output end of said conveyor;

a feed assembly disposed below said second column for vertically advancing a stack of articles contained within said second column for removal of a topmost article in said conveyor of surface conveys said stacks of articles from said input end to said output end upon completion of article removal.

14. The assembly according to claim 13, wherein said first and second columns are defined by first and second sets of guide rods, respectively.

15. The assembly according to claim 14, wherein each said first and second set of guide rods includes at least two pivotable guide rods disposed on said conveyor for pivotably moving out of a conveyance path of said stacks upon said upper conveyor surface.

16. The assembly according to claim 15, wherein each said pivotable guide rod comprises a lever arm and a linear actuator connected to said lever arm.

17. The assembly according to claim 14, wherein each of said first and second set of guide rods includes a pair of fixed guide rods fixedly secured to said conveyor frame.

18. The assembly according to claim 13, wherein said vertical feed assembly comprises a feeder plate and a linear actuator connected to one side of said feeder plate.

19. The assembly according to claim 13, wherein said conveyor comprises a double-belt conveyor.

20. The assembly according to claim 13, further comprising at least one sensor positioned in said conveyor frame proximate to said conveyor surface for regulating movement of said stacks of articles upon said conveyor surface from said input end to said output end.

21. The assembly according to claim 13, further comprising at least one sensor vertically mounted in said vertical feed column for controlling upward and downward movement of a stack of articles within said second column.

22. The assembly according to claim 21, wherein said vertical feed assembly further comprises a brake assembly for limiting movement of said vertical feed assembly.

* * * * *